United States Patent
Chang et al.

(10) Patent No.: US 7,751,971 B2
(45) Date of Patent: Jul. 6, 2010

(54) LOCATION MAPPING FOR KEY-POINT BASED SERVICES

(75) Inventors: Eric Chang, Beijing (CN); Kong-Kat Wong, Renton, WA (US); Difei Tang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 841 days.

(21) Appl. No.: 11/624,038

(22) Filed: Jan. 17, 2007

(65) Prior Publication Data

US 2008/0172173 A1 Jul. 17, 2008

(51) Int. Cl.
*G01C 21/00* (2006.01)
(52) U.S. Cl. ............... 701/207; 701/208; 701/213; 701/214; 701/215; 455/422.1; 455/457; 342/357.01; 342/357.1; 340/686.1
(58) Field of Classification Search .......... 701/207–208, 701/213–215; 455/422.1, 457, 456.1, 456.3; 342/357.01, 357.02, 357.06, 357.08, 357.09, 342/357.1, 357.12

See application file for complete search history.

(56) References Cited

U.S. PATENT DOCUMENTS

| | | | |
|---|---|---|---|
| 5,873,041 A * | 2/1999 | Ishii ............................. | 455/457 |
| 6,816,735 B1 | 11/2004 | Rayburn | |
| 7,035,650 B1 * | 4/2006 | Moskowitz et al. ....... | 455/456.5 |
| 7,096,029 B1 | 8/2006 | Parupudi | |
| 7,236,882 B2 * | 6/2007 | Karaoguz et al. ........... | 701/211 |
| 7,263,375 B2 * | 8/2007 | Zavada et al. ............ | 455/456.6 |
| 7,366,610 B2 * | 4/2008 | Karaoguz et al. .......... | 701/213 |
| 7,558,574 B2 * | 7/2009 | Feher ........................ | 455/440 |
| 7,584,048 B2 * | 9/2009 | Pham et al. ................. | 701/208 |

(Continued)

FOREIGN PATENT DOCUMENTS

JP 2004286520 A * 10/2004

(Continued)

OTHER PUBLICATIONS

IMOGA: An Architecture for Integrating Mobile Devices into Grid Applications; Ozturk, E.; Altilar, D.T.;Mobile and Ubiquitous Systems: Networking & Services, 2007. MobiQuitous 2007. Fourth Annual International Conference on;Digital Object Identifier: 10.1109/MOBIQ.2007.4451035; Publication Year: 2007 , pp. 1-8.*

(Continued)

*Primary Examiner*—Cuong Nguyen
(74) *Attorney, Agent, or Firm*—Lyon & Harr, LLP; Mark A. Watson

(57) ABSTRACT

A "Proxi-Mapper" combines location based services (LBS), local searching capabilities, and relative mapping in a way that minimizes bandwidth requirements and maximizes user experience. The Proxi-Mapper automatically determines approximate locations of one or more local user devices (cell phones, PDA's, media players, portable computing devices, etc.) and returns a lightweight model of local entities ("key-points") representing businesses, services or people to those devices. Key-points are maintained in one or more remote databases in which key-points are assigned to predetermined grid sections based on the locations of the corresponding entities. Metadata associated with the key-points provides the user with additional information relating to the corresponding entities. In various embodiments, user query options allow the Proxi-Mapper to pull or push relevant local key-point based information to user devices via one or more wired or wireless networks.

20 Claims, 4 Drawing Sheets

U.S. PATENT DOCUMENTS

| | | | |
|---|---|---|---|
| 7,587,274 B2* | 9/2009 | Kaldewey et al. | 701/208 |
| 7,603,125 B2* | 10/2009 | Feher | 455/440 |
| 7,610,149 B2* | 10/2009 | Karaoguz et al. | 701/208 |
| 7,627,320 B2* | 12/2009 | Feher | 455/440 |
| 7,630,717 B2* | 12/2009 | Feher | 455/440 |
| 2002/0013153 A1* | 1/2002 | Wilcock et al. | 455/456 |
| 2002/0045455 A1* | 4/2002 | Spratt | 455/456 |
| 2003/0036379 A1 | 2/2003 | Nikolai | |
| 2003/0195005 A1* | 10/2003 | Ebata | 455/445 |
| 2004/0024522 A1* | 2/2004 | Walker et al. | 701/210 |
| 2004/0157620 A1 | 8/2004 | Nyu | |
| 2004/0198395 A1* | 10/2004 | Kimoto et al. | 455/456.1 |
| 2005/0015307 A1 | 1/2005 | Simpson | |
| 2005/0181808 A1 | 8/2005 | Vaudreuil | |
| 2005/0277428 A1 | 12/2005 | Nathan Brown | |
| 2006/0022048 A1 | 2/2006 | Johnson | |
| 2006/0025130 A1 | 2/2006 | Krishnamurthi | |
| 2006/0046759 A1 | 3/2006 | Yoon | |
| 2006/0053378 A1 | 3/2006 | Fano | |
| 2006/0135183 A1* | 6/2006 | Zavada et al. | 455/457 |
| 2008/0172173 A1* | 7/2008 | Chang et al. | 701/207 |
| 2008/0266129 A1* | 10/2008 | Chiang | 340/686.1 |
| 2008/0318547 A1* | 12/2008 | Ballou et al. | 455/410 |

FOREIGN PATENT DOCUMENTS

| | | | |
|---|---|---|---|
| WO | WO2006046845 A1 | 5/2006 | |

OTHER PUBLICATIONS

J.Hwang,P.Aravamudham, "Proxy-based Middleware Services for Peer-to-Peer Computing in-Virtually Clustered Wireless Grid Networks", http://wirelessgrids.net/docs/CCCTO3 Hwang T983ST.pdf, (as of Apr. 5, 2007).*

L.McKnight, J.Howison, S.Bradner, "Wireless Grids Distributed Resource Sharing by Mobile, Nomadic, and Fixed Devices", IEEE Internet Computing, 2004.*

F.Berman,G. Fox, T. Hey, 2003. "The Evolution of the Grid" in Grid Computing—Making the Global Infrastructure a Reality, pp. 65-100. D.D. Roure,M.A. Baker, N.R. Jennings, N.R. Shadbolt, John Wiley and Sons Ltd,2003.*

M.Tuisku, "Wireless Java-enabled MIDP devices as peers in Grid infrastructure", First European Across Grids Conference, Santiago de Compostela, Spain, 2004.*

Research on Resource Directory Service for Sharing Remote Sensing Data under Grid Environment; Lina Yut et al.; Grid and Cooperative Computing, 2009. GCC '09. Eighth International Conference on; Digital Object Identifier: 10.1109/GCC.2009.41 Publication Year: 2009 , pp.*

Modeling Autonomic QoS Control for Grid Service Using Petri Nets; Jun Gu et al., Grid and Cooperative Computing, 2009. GCC '09. Eighth International Conference on; Digital Object Identifier: 10.1109/GCC.2009.74; Publication Year: 2009 , pp. 3-8.*

A New Grid GIS Prototype for Vector Geospatial Data; Yong Zhao et al,; Grid and Cooperative Computing, 2009. GCC '09. Eighth International Conference on; Digital Object Identifier: 10.1109/GCC. 2009.13; Publication Year: 2009 , pp. 367-372.*

Distributed grid location estimation scheme based on Euclidean distance; Jia Zi-xi et al.; Industrial Electronics and Applications, 2008. ICIEA 2008. 3rd IEEE Conference on; Digital Object Identifier: 10.1109/ICIEA.2008.4582694; Publication Year: 2008 , pp. 1128-1132.*

Recurrent Grid Based Voting Approach for Location Estimation in Wireless Sensor Networks; Gupta, A. et al.; Ubiquitous, Autonomic and Trusted Computing, 2009. UIC-ATC '09. Symposia and Workshops on; Digital Object Identifier: 10.1109/UIC-ATC.2009.43; Publication Year: 2009 , pp. 263-267.*

Mobile Positioning Using Enhanced Signature Database Method and Error Reduction in Location Grid; Manzuri, M.T. et al., Communications and Mobile Computing, 2009. CMC '09. WRI International Conference on; vol. 2; Digital Object Identifier: 10.1109/CMC.2009. 37; Publication Year: 2009 , pp. 175-179.*

Performance Improvement of a Grid-Based Location Service in Mobile Ad Hoc Networks; Jomeiry, A. et al.; Mobile Ubiquitous Computing, Systems, Services and Technologies, 2008. UBICOMM '08. The Second International Conference on; Digital Object Identifier: 10.1109/UBICOMM.2008.75; Publication Year: 2008 , pp. 165-170.*

The Idle Mobile Resource Discovery and Management Scheme in Mobile Grid Computing Using IP-paging; DaeWon Lee e; Ubiquitous Information Technologies & Applications, 2009. ICUT '09. Proceedings of the 4th International Conference on Digital Object Identifier: 10.1109/ICUT.2009.5405730; Publication Year: 2.*

IMOGA: An Architecture for Integrating Mobile Devices into Grid Applications; Ozturk, E.et al.;Mobile and Ubiquitous Systems: Networking & Services, 2007. MobiQuitous 2007. Fourth Annual International Conference on; Digital Object Identifier:; Digital Object Identifier: 10.1109/ICIE.2009.225; Publication Year: 2009 , pp. 333-336.*

A Secure Distributed Location Service Scheme for Mobile Ad Hoc Networks;Jipeng Zhou et al.;Computer Network and Multimedia Technology, 2009. CNMT 2009. International Symposium on; Digital Object Identifier: 10.1109/CNMT.2009.5374735 Publication Year: 2009 , pp. 1-4.*

A New Mobile Spatial Information Service Grid Computing Model Based on Mobile Agent; Tian Gen et al.; Communications and Mobile Computing, 2009. CMC '09. WRI International Conference on; vol. 2; Digital Object Identifier: 10.1109/CMC.2009.14 Publication Year: 2009 , pp. 596-600.*

Lamarca, A., Chawathe, Y., Consolvo, S., Hightower, J., Smith, I., Scott, J., Sohn, T., Howard, J., Hughes, J., Potter, F., Tabert, J., Powledge, P., Borriello, G., and Schilit, B. 2005. Place Lab: Device positioning using radio beacons in the wild. In Proceedings of the Third International Conference on Pervasive Computing, Munich, May 2005.

Gruteser, M. and Grunwald, D. 2003. Anonymous Usage of Location-Based Services Through Spatial and Temporal Cloaking. In Proceedings of the 1st international Conference on Mobile Systems, Applications and Services (San Francisco, California, May 5-8, 2003). MobiSys '03. ACM, New York, NY, 31-42.

Barkuss, Louise, and Anind Dey. "Location-Based Services for Mobile Telephony: a Study of Users' Privacy Concerns." Proceedings of INTERACT, Jul. 2003.

Chen, X., Chen, Y., and Rao, F. 2003. An efficient spatial publish/ subscribe system for intelligent location-based services. In Proceedings of the 2nd international Workshop on Distributed Event-Based Systems (San Diego, California, Jun. 8-8, 2003). DEBS '03. ACM, New York, NY, 1-6.

* cited by examiner

LOCATION MAPPING FOR KEY-POINT BASED SERVICES

BACKGROUND

1. Technical Field

The invention is related to providing location-based services (LBS), and in particular, to a system for providing locally relevant information, services, and relative mapping, to one or more user devices as a function of approximate user device positions relative to a dynamic database of geographic points of interest.

2. Related Art

Many GPS-type location identification devices provide the user with a map of the locality surrounding the device. For example, conventional handheld GPS-type devices typically provide a graphical and/or textual street map to the user based on predefined maps accessible to the device as a function of a present location determined by the device.

Unfortunately, devices with integral location finding capability (including satellite-based navigation systems such as GPS, the European "Galileo" system, the Russian "Glonass" system, etc.) tend to be relatively expensive, and typically require a large amount of storage space to maintain a set of local maps, or significant bandwidth capability for downloading current maps, if available. Further, because the maps provided with integral location finding capability are generally predefined, locally relevant information may not be available to the user with respect to recent changes in that information. In addition, satellite-based navigation systems tend to work poorly, if at all, either indoors or in "urban canyons" where the user is surrounded by many tall buildings.

In addition, there are a number of network-based mapping tools available. Network-based mapping tools generally provide the user with on-demand textual or graphical maps of user specified locations. Further, several related systems provide the user with on-demand maps of automatically determined device locations. Automatic determination of location is typically based conventional positioning technology such as satellite navigation (GPS, Galileo, Glonass, etc.) or as some function of WiFi mapping, GSM-based cell signal mapping, RFID tracking, etc. For example, typical cell phones can be rapidly tracked by using signal triangulation from nearby cell towers to pinpoint the location of the phone (and thus the user carrying the phone) to within around 50 meters. Similarly, WiFi mapping generally locates a user by evaluating signal samples from multiple access points.

Conventional location-based services (LBS) leverage conventional positioning technology, such as the techniques described above, to provide personalized, location-based information to individual users as a function of their approximate location. Once an approximate user location is known, location-specific information is then either pulled or pushed to local user devices depending upon the location model being used. Examples of location-specific information include, for example, navigation assistance, locations of particular businesses or business types, people (i.e., "social networking"), restaurants, gas stations, etc. Additional examples include "wireless advertising" that is used to provide user devices with information such as "electronic coupons" or special discounts for business entities located near the user.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A "Proxi-Mapper," as described herein, combines location based services (LBS), local searching capabilities, and relative mapping in a way that minimizes bandwidth requirements and maximizes user experience. In general, mobile data access is typically cost and bandwidth prohibitive for typical users and typical portable user devices (cell phones, PDA's, media players, etc.). Consequently, the Proxi-Mapper leverages conventional location or positioning techniques to determine approximate device locations for providing user devices with a lightweight model of local entities ("key-points") representing businesses, services, people, transportation modalities, objects, etc. In addition, in various embodiments, the lightweight model includes metadata associated with the key-points along with proximity between the key-points in combination with local search services. This lightweight model is then used for both UI rendering purposes (textual and/or graphical) and/or for direction or mapping purposes to combine LBS and local search services into a simple framework centered on the key-points.

In other words, the Proxi-Mapper provides a set of location based solutions, requiring only approximate accuracy in terms of user location, to bring location based services to a wide range of mobile electronic devices. Device location is determined by using combinations of existing positioning technology to approximately deduce the location of one or more user devices. Conventional positioning technology leveraged by the Proxi-Mapper includes techniques such as GPS, cell phone triangulation, WiFi mapping, RFID tracking, etc. Local entities represented by key-points include businesses (restaurants, taxis, retail stores, etc.), services (government, hospital, school, etc.), people, transportation modalities, objects, etc. In addition, optional metadata associated with each key-point provides further levels of detail for each entity. As a result, the approximate user position, in combination with the location, proximity and type of various key-points, enable local (location-based) searching and services relative to business-to-customer or customer-to-customer matching.

In particular, the Proxi-Mapper includes a mapping database of key-points and location based services that are designed to enable enterprise and consumer scenarios by selectively providing key-point related data to individual user devices as a function of the approximate location of those devices. Key-points are maintained in a geographical "grid format" that groups key-points into grid sections using a normalized position for each key-point in a grid section. User devices are also approximately located relative to these grid sections. As a result, the corresponding relative location of the user and key-points in nearby grid sections enables the Proxi-Mapper to provide location based services to the user as a function of the overall grid while minimizing user device bandwidth requirements. Note that in one embodiment, the approximate location of the user device is treated as a key-point for mapping purposes.

One advantage of using the grid-based format for the mapping database of key-points is that the overall set of key-points can be viewed as a two-dimensional array, wherein particular key-points are pre-assigned to particular elements of the array. As such, it is simple to extract particular key-points from the key-point database corresponding to some range of grid sections around the user's grid location, since searches can be limited to a very small set of grid sections (array elements) around the user's grid. Further, in various embodiments, key-points presented to the user are filtered using various user-selectable criteria, such as, for example, distance, direction, availability, cost, time, shared interests, etc.

In view of the above summary, it is clear that the Proxi-Mapper described herein provides a unique system and method for presenting locally relevant information and services to one or more user devices as a function of approximate user positions relative to a database of predefined key-points. In addition to the just described benefits, other advantages of the Proxi-Mapper will become apparent from the detailed description which follows hereinafter when taken in conjunction with the accompanying drawing figures.

DESCRIPTION OF THE DRAWINGS

The specific features, aspects, and advantages of the present invention will become better understood with regard to the following description, appended claims, and accompanying drawings where:

DETAILED DESCRIPTION

In the following description of various embodiments of the present invention, reference is made to the accompanying drawings, which form a part hereof, and in which is shown by way of illustration specific embodiments in which the invention may be practiced. It is understood that other embodiments may be utilized and structural changes may be made without departing from the scope of the present invention.

Figure 1:
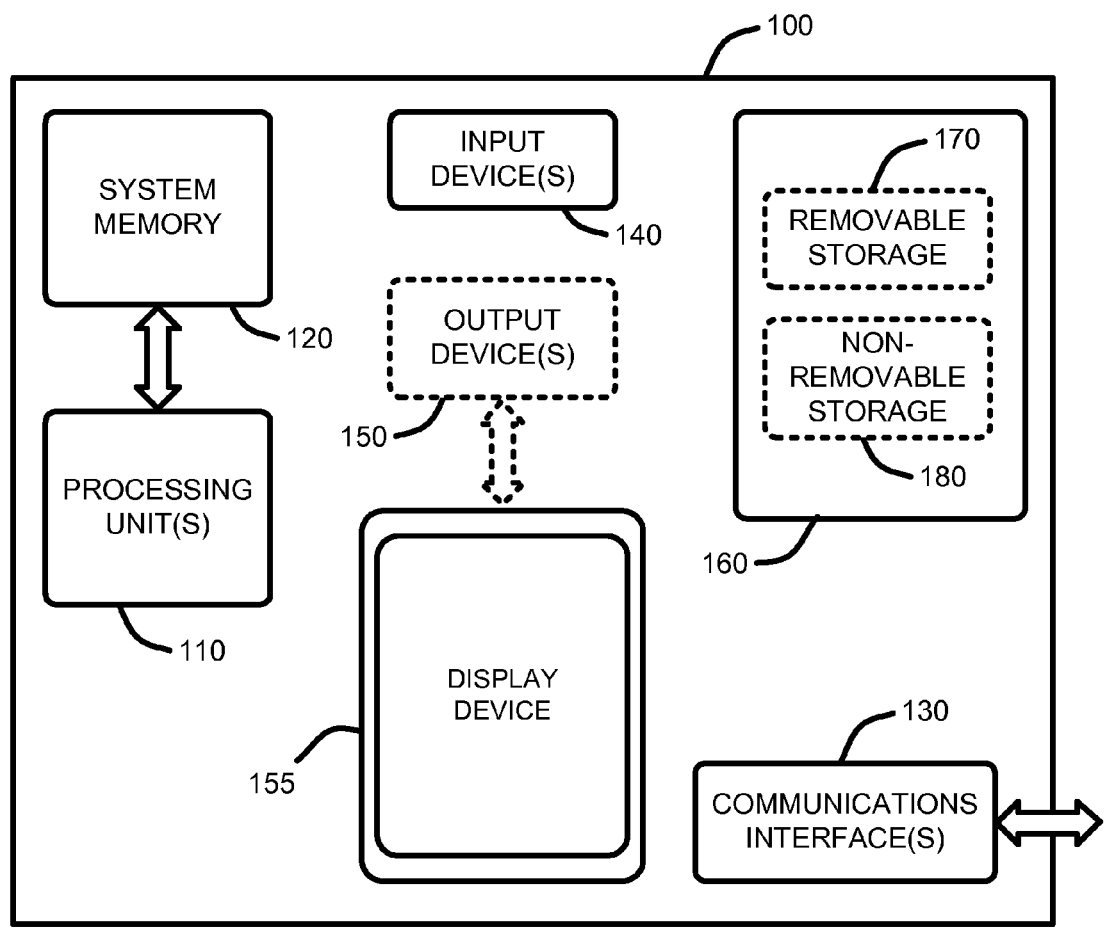
FIG. 1 is a general system diagram depicting a general-purpose computing device constituting an exemplary system for implementing various elements of a Proxi-Mapper, as described herein.

1.0 Exemplary Operating Environment:

FIG. 1 illustrates an example of a simplified computing environment on which various embodiments and elements of a "Proxi-Mapper," as described herein, may be implemented. It should be noted that any boxes that are represented by broken or dashed lines in FIG. 1 represent alternate embodiments of the simplified computing environment, as described herein, and that any or all of these alternate embodiments, as described below, may be used in combination with other alternate embodiments that are described throughout this document.

At a minimum, to enable a computing device to implement the "Proxi-Mapper" (as described in further detail below), the computing device 100 must have some minimum computational capability and either a wired or wireless communications interface 130 for receiving and/or sending data to/from the computing device, or a removable and/or non-removable data storage for retrieving that data.

In general, FIG. 1 illustrates an exemplary general computing system 100. The computing system 100 is only one example of a suitable computing environment and is not intended to suggest any limitation as to the scope of use or functionality of the invention. Neither should the computing system 100 be interpreted as having any dependency or requirement relating to any one or combination of components illustrated in the exemplary computing system 100.

In fact, the invention is operational with numerous other general purpose or special purpose computing system environments or configurations. Examples of well known computing systems, environments, and/or configurations that may be suitable for use with the invention include, but are not limited to, personal computers, server computers, hand-held, laptop or mobile computer or communications devices such as cell phones, PDA's, pocket PC's or media players, multi-processor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer in combination with various hardware modules. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

For example, with reference to FIG. 1, an exemplary system for implementing the invention includes a general-purpose computing device in the form of computing system 100. Components of the computing system 100 may include, but are not limited to, one or more processing units 110, a system memory 120, one or more communications interfaces 130, one or more input and/or output devices, 140 and 150, respectively, and data storage 160 that is removable and/or non-removable, 170 and 180, respectively.

The communications interface 130 is generally used for connecting the computing device 100 to other devices via any conventional interface or bus structures, such as, for example, a parallel port, a game port, a universal serial bus (USB), an IEEE 1394 interface, a Bluetooth™ wireless interface, an IEEE 802.11 wireless interface, etc. Such interfaces 130 are generally used to store or transfer information or program modules to or from the computing device 100.

The input devices 140 generally include devices such as a keyboard and pointing device, commonly referred to as a mouse, trackball, or touch pad. Such input devices may also include other devices such as a joystick, game pad, satellite dish, scanner, radio receiver, and a television or broadcast video receiver, or the like. Conventional output devices 150 include elements such as a computer monitors or other display devices, audio output devices, etc. Other input 140 and output 150 devices may include speech or audio input devices, such as a microphone or a microphone array, loudspeakers or other sound output device, etc.

The data storage 160 of computing device 100 typically includes a variety of computer readable storage media. Computer readable storage media can be any available media that can be accessed by computing device 100 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules, or other data.

Computer storage media includes, but is not limited to, RAM, ROM, PROM, EPROM, EEPROM, flash memory, or other memory technology; CD-ROM, digital versatile disks (DVD), or other optical disk storage; magnetic cassettes, magnetic tape, magnetic disk storage, hard disk drives, or other magnetic storage devices. Computer storage media also includes any other medium or communications media which can be used to store, transfer, or execute the desired information or program modules, and which can be accessed by the computing device 100. Communication media typically embodies computer readable instructions, data structures, program modules or other data provided via any conventional information delivery media or system.

The computing device 100 may also operate in a networked environment using logical connections to one or more remote computers, including, for example, a personal computer, a server, a router, a network PC, a peer device, or other common network node, and typically includes many or all of the elements described above relative to the computing device 100.

The exemplary operating environments having now been discussed, the remaining part of this description will be devoted to a discussion of the program modules and processes embodying the "Proxi-Mapper."

2.0 Introduction:

In general, a "Proxi-Mapper," as described herein, combines location based services (LBS), local searching capabilities, and relative mapping in a way that minimizes bandwidth requirements and maximizes user experience. The Proxi-Mapper leverages conventional location or positioning techniques to determine approximate device locations for providing user devices (cell phones, PDA's, media players, portable computing devices, etc.) with a lightweight model of local entities ("key-points") representing businesses, services or people. Note that in the most generic case, key-points also include anything that can be tracked or located, including, for example, transportation modalities (e.g., personal cars, motorcycles, public trains, public buses, aircraft), personal objects (e.g., keys, wallets, computers, books), etc.

This lightweight model is then used for both UI rendering purposes (textual and/or graphical) and/or for direction or mapping purposes to combine LBS and local search capabilities into a simple framework centered on the key-points. In other words, given approximate user device locations, one or more remote servers maintaining one or more databases of key-points are used for either pulling or pushing local key-point based information to those user devices via one or more wired or wireless networks.

It is important to note that while the Proxi-Mapper can act as a mapping tool, the primary focus of the Proxi-Mapper is to provide a platform that enables flexible LBS applications that ties various entities together. As a result, many of the embodiments described herein are either enabled, or further enhanced, by associating adequate metadata with particular key-points. In fact, as described herein, the use of metadata for presenting particular key-points to users is one of the concepts that allow the use of the approximate grid-based mapping techniques described herein to provide relevant information to the user.

2.1 System Overview:

As noted above, the Proxi-Mapper described herein enables a system and method for providing user devices with LBS, local search capabilities, and relative mapping as a function of approximate user position. In other words, the Proxi-Mapper provides a set of location based solutions, requiring only approximate accuracy in terms of user location, to bring location based services to a wide range of mobile electronic devices.

Device location is determined by using combinations of one or more existing positioning technologies to approximately deduce the location of one or more user devices. Conventional positioning technology leveraged by the Proxi-Mapper includes techniques such as GPS (or other satellite navigation), cell phone triangulation, WiFi mapping, RFID tracking, etc. Note that these types of conventional positioning or location identification technologies are well understood by those skilled in the art, and will not be described in detail herein. Clearly, any desired type of positioning or location identification technology can be used by the Proxi-Mapper, including manual user input for specifying a current location, and as such, the Proxi-Mapper is not intended to be limited to the use of the exemplary positioning or location identification technologies referenced herein.

Local entities represented by key-points include businesses (restaurants, taxis, retail stores, etc.), services (government, hospital, school, etc.), or people (including the user or user device(s) which is treated as a dynamic or mobile key-point). Further, as noted above, key-points also include anything that can be tracked or located such as, for example, transportation modalities (e.g., personal cars, motorcycles, public trains, public buses, aircraft), personal objects (e.g., keys, wallets, computers, books), etc. For example, if a user loses a wallet having an RFID tag, so long as the wallet is in range of an RFID reader, it's location can be determined and reported to the user device as a key-point. In addition, optional metadata associated with each key-point provides further levels of detail for each local entity. As a result, the approximate user position, in combination with the location, proximity and type of various key-points, enable local (location-based) key-point searching, relative key-point mapping, and services with respect to business-to-customer or customer-to-customer matching (with the user being referred to here as a "customer).

The Proxi-Mapper maintains at least one database of relatively mapped key-points and location based services that are designed to enable enterprise and consumer scenarios by selectively providing key-point related data to individual user devices (and thus to the user/customer) as a function of the approximate location of those devices. Key-points in the database are maintained in a geographical "grid format" that groups key-points into grid sections using a normalized position for each key-point in a grid section. In other words, the world is divided into predefined grid sections of some predefined size, such as, for example, grid sections having an area of 500 square meters.

Grid sections can be any shape desired (rectangular, hexagonal, oval, circular, etc.) and can have any desired area. Each grid section is then identified by a single geographical point (such as by using actual latitude/longitude coordinates, for example) regardless of the total area of each grid section. Every known entity represented by a key-point is then assigned to one grid section (and thus a single grid point) corresponding to the actual location of that entity. Furthermore, in one embodiment, some key-points may be mobile (other people having trackable electronic devices, taxis, etc.). As such, these mobile key-points are either maintained in a separate dynamic database of mobile key-points (along with the current grid points) or their grid position in the overall key-point database is updated at some desired frequency.

User devices are also approximately located relative to these grid sections. As a result, the corresponding relative location of the user and key-points in nearby grid sections enables the Proxi-Mapper to provide location based services to the user as a function of the overall grid while minimizing user device bandwidth requirements. Note that in one embodiment, the approximate location of the user device is treated as a key-point for mapping and matching purposes. Further, since the user is expected to be mobile, user device positions are updated at some desired frequency.

One advantage of using the grid-based format for the mapping database of key-points is that the overall set of key-points can be viewed as a two-dimensional array (with "x" and "y" array descriptors corresponding to the predefined latitude and longitude coordinates of the various grid sections), wherein particular key-points are pre-assigned to particular elements of the array. In other words, each grid section corresponds to a list of key-points in the array. As such, it is extremely efficient to extract particular key-points from the key-point database corresponding to some range of grid sections around the current grid location of the user, since searches can be limited to a very small set of grid sections (array elements) around the grid section containing the user. Further, in various embodiments, key-points presented to the user are filtered using various user-selectable criteria, such as, for example, distance, direction, availability, cost, time, shared interests, etc.

In addition, particular searches can return relatively large sets of key-points, depending upon local key-point density and the particular search criteria being used. Consequently, in one embodiment, keypoints are "ranked" as a way to further limit or filter those searches. For example, in one embodiment, if the user wants to request taxis that are available, he may also rank the returning key-points (corresponding to the taxis) by their distance to his current location. More generally, the Proxi-Mapper provides the capability to rank retrieved key-point data based on either predetermined or user-defined ranking functions, such as, for example, distance, cost, peer ratings, etc. A subset including some or all of the returned key-points are then provided to the user, as described herein, as a function of that ranking.

It should be noted that the grid-based key-point display format described herein is not intended to provide a geographical "map" in the classical sense. In fact, in various embodiments, this "grid" is used in combination with one or more geographic maps. For example, in various embodiments, in addition to the use of the grid-based format summarized above, if the user device being used to display the Proxi-Mapper grid has sufficient bandwidth and/or display capability, the grid is overlaid on an actual geographic map of the area corresponding to the grid being displayed. One of the advantages of this embodiment is that it enhances the user experience by allowing the user to more quickly identify relevant portions of local maps relative to the keypoints in particular grid sections being overlaid on the actual map.

Figure 2:
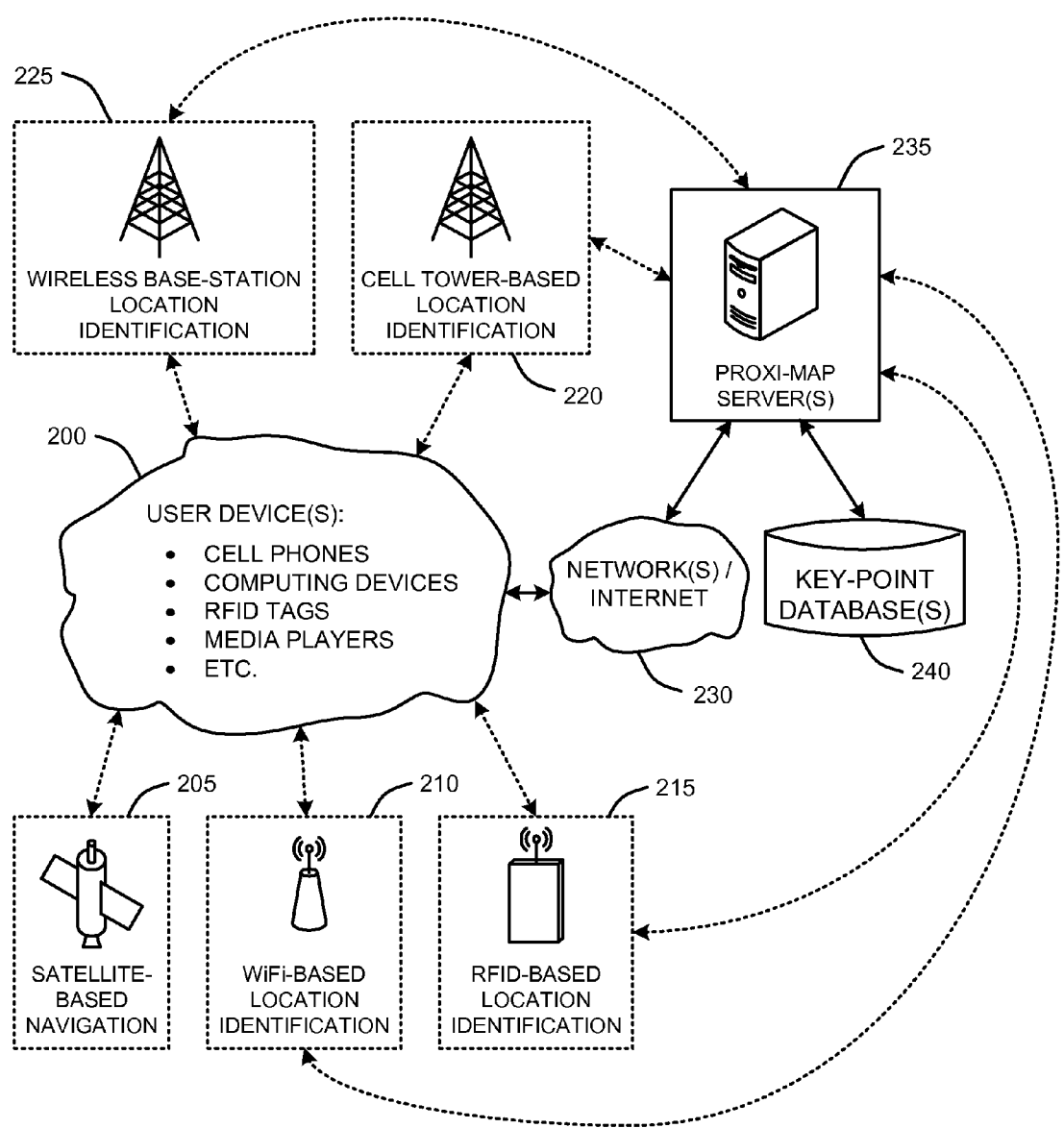
FIG. 2 illustrates an exemplary system diagram showing generic connections between various system elements for implementing the Proxi-Mapper.

2.2 System Architectural Overview:

Connections between the various elements of the Proxi-Mapper summarized above are illustrated by the general structural diagram of FIG. 2. In particular, the diagram of FIG. 2 illustrates various interrelationships between various elements of the Proxi-Mapper, as described herein. It should be noted that any boxes and interconnections between boxes that are represented by broken or dashed lines in FIG. 2 represent alternate embodiments of the Proxi-Mapper described herein, and that any or all of these alternate embodiments, as described below, may be used in combination with other alternate embodiments that are described throughout this document.

In general, the Proxi-Mapper is enabled by using conventional tracking technologies to determine approximate positions of one or more user devices 200. As noted above, these user devices 200 include electronic devices such as, for example, cell phones, PDA's, portable (or stationary) computing devices, RFID tags (either stand-alone or embedded in other devices), network enabled media players, etc. Further, also as noted above, conventional tracking technologies used to approximate user devices 200 include technologies such as, for example, GPS or other satellite-based navigation 205, WiFi-based location identification 210, RFID-based location identification 215, wireless base-station signal tracking for location identification 225, cell tower-based cell phone signal location identification 220, etc. Such location identification technologies are well known to those skilled in the art, and will not be described in detail herein.

One advantage to using one or more conventional location identification technologies (205, 210, 215, 220, and 225) is that user device tracking and location can make use of the most accurate and/or lowest cost technology available at any particular time. For example, if the user is outdoors and is carrying a device (such as a cell phone, for example) having GPS capability, that device can directly report very accurate current positions. Then, when the user goes indoors, cell tower cell signal triangulation can be used to locate the position of that same individual (although typically with a reduced level of positional accuracy.) If the user then enters an area where the cell phone cannot be tracked, other devices carried by the user, such as a PDA connected to the Internet via a WiFi hotspot can be used to locate the user. In other words, any available tracking can be used to track any available electronic device carries by the user to keep track of the current approximate location of the user.

The current approximate location of the user is then reported to one or more "Proxi-Map Servers" 235 via one or more network or Internet connections 230. Reporting of positional information is provided either by the user device itself (such as where the device contains integral GPS capability or the user manually enters a current position) or by one or more of the various location identification technologies (205, 210, 215, 220, and 225) described above.

The Proxi-Map Server 235 then queries one or more key-point databases 240 to find local key-points relevant to the current approximate position of the user. This key-point information is then returned to one or more of the user devices 200 via one or more network or Internet connections 230. Note that the network path or paths used returning the key-point information to the user is dependent upon the types of devices carried by the user. For example, if the user carries only a cell phone that does not have any network connection capability (such as capability to connect to a WiFi hotspot), the key-point information can be returned to that cell phone using conventional SMS messaging sent from the Proxi-Map Server 235 via the cell service provider associated with that cell phone.

Figure 3:
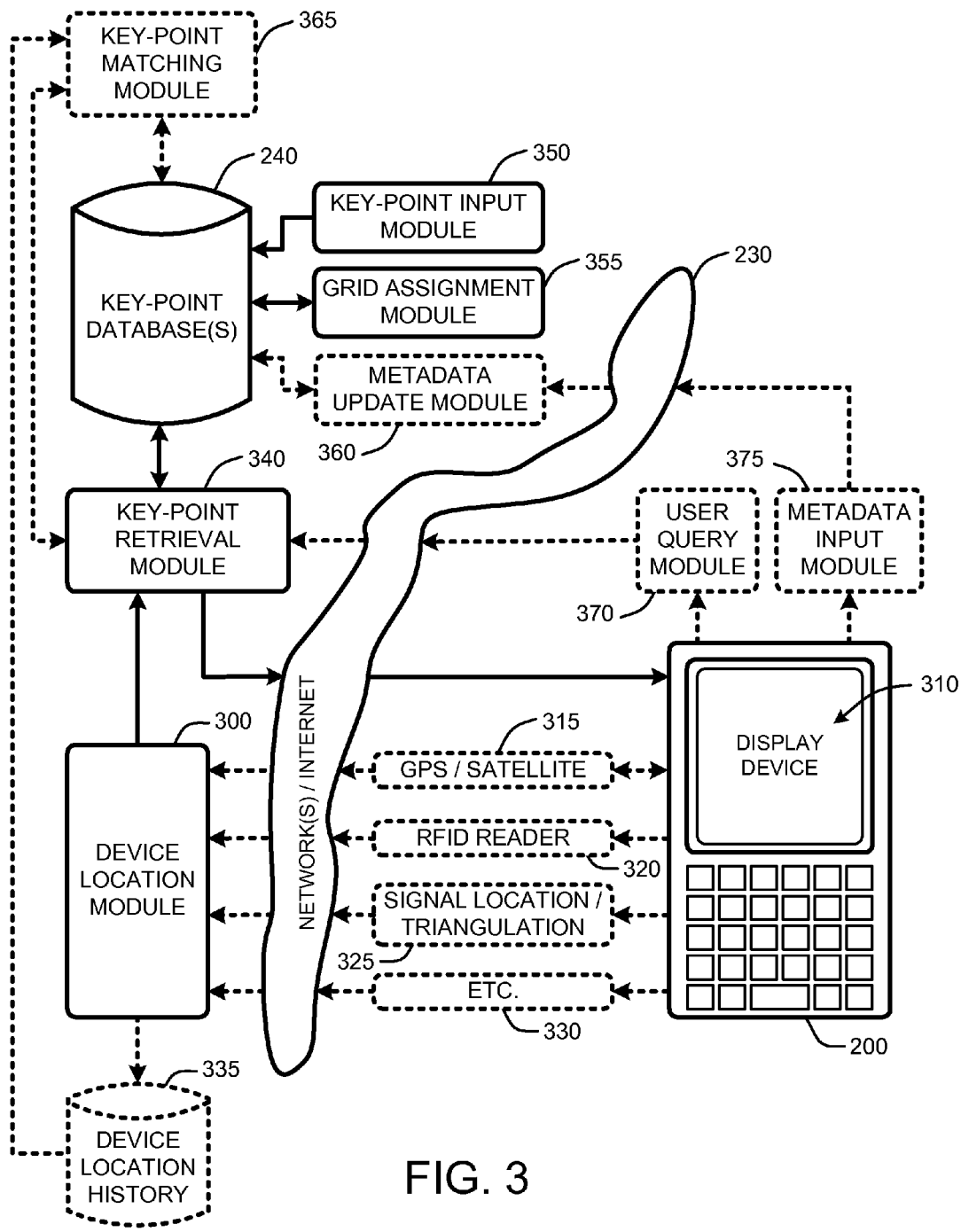
FIG. 3 illustrates an exemplary architectural system diagram showing exemplary program modules for implementing the Proxi-Mapper.

2.3 System Operational Overview:

The processes and element interconnections summarized above are further illustrated by the general system diagram of FIG. 3. In particular, the system diagram of FIG. 3 illustrates the interrelationships between program modules for implementing the Proxi-Mapper, as described herein. It should be noted that any boxes and interconnections between boxes that are represented by broken or dashed lines in FIG. 3 represent alternate embodiments of the Proxi-Mapper described herein, and that any or all of these alternate embodiments, as described below, may be used in combination with other alternate embodiments that are described throughout this document.

In general, as illustrated by FIG. 3, the Proxi-Mapper generally begins operation by using a device location module 300 to determine an approximate geographic position of one or more user devices 200. Note that it is assumed that the user is typically co-located with the devices, and as such, location of the device will also serve to locate the user.

As noted above, the device location module uses conventional positioning techniques such as GPS 315 (or other satellite navigation), RFID readers 320, signal location or triangulation 325 (cell phone triangulation, WiFi mapping, etc), or any other conventional positioning technology 330 that can approximately locate a user (or user device). As discussed above, reporting of the user device 200 position, or of information used by the device location module 300 to determine the user device position, is accomplished by sending the pertinent data to the device location module via one or more network or Internet connections 230, depending upon the type of electronic device being tracked or located, and depending upon where that tracking is being performed.

Once the device location module 300 has determined or received the approximate geographic position of the user device or devices 200, that position information is provided to a key-point retrieval module 340. The key-point retrieval module 340 then identifies the grid sector corresponding to that position information and retrieves corresponding key-point information from one or more key-point databases 240 for one or more grid sectors including and surrounding the grid sector containing the user device 200. This key-point information is then provided to one or more of the user devices 200.

Figure 4:
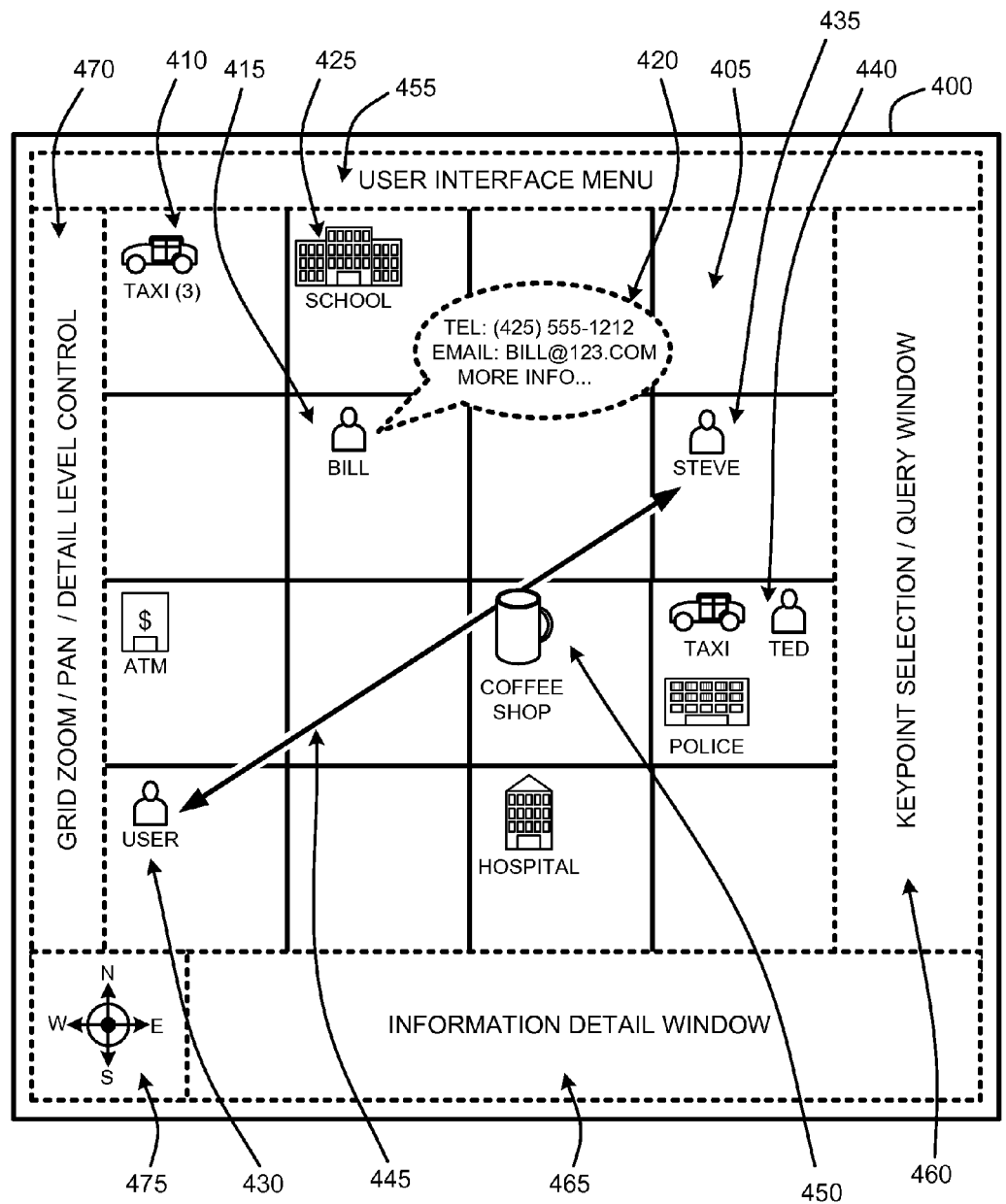
FIG. 4 illustrates an exemplary user interface display for implementing various embodiments of the Proxi-Mapper, as described herein.

Once the key-point information has been provided to the user device 200, a local key-point display application embedded in the user device renders a grid-based display of those key-points on a display device 310 of the user device 200 (note that an example of this grid-based display is described in Section 4 with respect to FIG. 4).

By default, the key-points provided to the user device 200 by the key-point retrieval module 340 include all of the known key-points for each grid section to be rendered on the user display device 310. However, in various embodiments, the key-points to be rendered on the user display device 310 are filtered or limited in response to a user query submitted via a user query module 370.

For example, in one embodiment, only those key-points matching a user query (and also corresponding to the grid sections to be retrieved) are retrieved by the key-point retrieval module 300 from the key-point database 240. Again, the retrieved key-points are then provided to the user device 200, as discussed above. Alternately, all of the key-points for the corresponding grid sections are provided as described above. Then, the filtering or limitation of key-points is performed locally by the user device 200 in response to the user query input via the user query module 370. One advantage of this second embodiment is that in the case where a user performs multiple queries for a particular location (or set of grid sections), the key-point retrieval module 300 will not be required to repeatedly query the key-point database 240 and send the resulting information to the user device 200.

In related embodiments, a key-point matching module 365 is used to match particular key-points within one or more grid sections to the user. For example, as noted above, the user (associated with the user device 200) is treated as a mobile key-point that is located within a particular grid at any point in time. Therefore, if the user expresses an interest in being matched with a particular service or with another particular user (via the user query module 370), the key-point matching module 365 will provide the key-point retrieval module with one or more potentially matching key-points (if any are available) and may also notify those key-points (via user devices associated with those key-points) that there is a potential match for a service or another user.

For example, if the user is looking for a nearby taxi, the user can input a request for a taxi via the user query module 370. The key-point retrieval module then passes this request to the key-point matching module 365. The key-point matching module will then query the key-point database to determine if there are any nearby taxis (that are registered as key-points) within any relatively nearby grid sections. Matching key-points (taxis) will then be notified of the user request (and current grid section of the user) via the key-point retrieval module 340 that is in communication with the user device associated with the taxi key-point. Similarly, the user device 200 making the request will also be notified of the matching key-point (taxi) along with the current grid section of that taxi via the key-point retrieval module 340, as described above.

In the same manner as requesting a taxi, the user query module 370 can be used to query the key-point retrieval module 340 for other services or particular individuals, so long as those services or people are registered as key-points.

In another embodiment, historical user positional information is maintained in one or more databases 335 for use in offering particular services to a user/user device. For example, if the device location history 335 indicates that a particular user is frequently in the vicinity of a particular key-point (e.g., a retail establishment such as, for example, a coffee shop), information relating to that coffee shop (such as, for example, an electronic discount coupon for a cup of coffee) can be automatically provided to the user as a location-based service (LBS) via the key-point matching module 365 and the key-point retrieval module 340.

Similarly, if the device location history 335 associated with the user indicates that the user has spent some period of time in a clothing store near the men clothing department, the key-point matching module 365 can send the user device 200 sale information pertaining to men's clothing at one or more retail establishments associated with nearby key-points.

Clearly, the two key-point matching examples (based on device location history 335) described above are not intended to be limiting. In fact, it should be clear that user positional information is useful for enabling the Proxi-Mapper to support an almost limitless number of service-to-user or business-to-user matching scenarios for pushing useful key-point based information to the user.

However, it is important to note that in order to protect user privacy concerns, in various embodiments, the user is provided with the capability to either opt-in or opt-out with respect to both recording of device location history 335 and desire to receive key-point based information relating to that device location history.

Further, in related embodiments, metadata associated with particular key-points (location, services, people, transportation modalities, objects, etc.) include one or more privacy or security flags to restrict either when, or to who, key-point information will be disclosed. For example, a given user can query the key-point database in an attempt to retrieve key-points information for all businesses and services around him. However, one or more of those businesses can restrict reporting of their existence to particular users, if desired. One simple example of this idea is a business or service that restricts reporting of key-point information to users based on whether those users are on a predefined privacy/security list, or the like. Further, privacy/security considerations can change as a function of time and or location. For example, a particular user restrict reporting of his current location to be viewable (as a key-point) to work colleagues only while that user is at work and only during work hours.

Clearly, these simple examples of privacy and security concerns are not intended to limit the scope of the privacy and security features of the Proxi-Mapper. In fact, any desired restrictions on who has access to particular key-points, and when that access may be granted can be tied to any one or more key-points so that key-point information is not provided to users that are not authorized to view or interact with that information.

As noted above, the key-point database 240 includes a listing of key-points. Each key-point represents a unique local entity (i.e., local businesses, services, people, transportation modalities, objects, etc.). Further, because each local entity includes a geographic location (either exact or approximate) each of the corresponding key-points is assigned to a particular grid section by a grid assignment module 365. Note that this feature allows users to search for locations of particular key-points (such as a lost wallet, the location of their car or a friends motorcycle, etc.) in the manner described above for retrieving key-point locations.

In general, as described in further detail in Section 3.2, key-points are initially input into the key-point database 240 via a key-point input module 350. Any of a number of techniques can be used to populate the key-point database 240 via the key-point input module 350. For example, in one embodiment, vendors associated with local entities (providing particular businesses or services) are permitted to register as key-points by entering their information and geographic location via a web or Internet portal associated with the key-point input module 350.

Similarly, individuals wishing to register as key-points can also enter their data via the key-point input module 350. However, in the case of individuals (and other mobile entities including services or businesses such as taxis), who are expected to be mobile, it is important that those entities also provide information for one or more user devices that can be tracked or located by the Proxi-Mapper system (via the device location module 300) so that such mobile key-points can be associated with the appropriate grid section in the key-point database. In the case of mobile key-points, such key-points are either maintained in a separate database that is periodically updated as those key-points change location, or are maintained along with the stationary key-points, and individually updated as necessary.

In addition to including location information, each key-point in the key-point database 240 also includes some amount of metadata (see Section 3.2 for more information). Depending upon the bandwidth available to individual devices (or potentially upon user queries entered via the user query module 370) some or all of this metadata will be transmitted to the user device via the key-point retrieval module 340 along with the corresponding key-point information, as described above.

Further, in a related embodiment, the user is permitted to update particular metadata, such as, for example, a user rating for a particular business or service associated with a particular key-point. Such updates are provided via a metadata input module 375 that communicates with a metadata update module 360 tied to the key-point database 240.

3.0 Operational Details of the Proxi-Mapper:

The above-described program modules are employed for implementing the Proxi-Mapper described herein. As summarized above, this Proxi-Mapper provides a system and method for providing user devices with LBS, local search capabilities, and relative mapping as a function of approximate user position. The following sections provide a detailed discussion of the operation of the Proxi-Mapper, and of exemplary methods for implementing the program modules described in Section 2. In particular, the following paragraphs describe user device tracking; key-points; grid sections and relative key-point mapping; and exemplary location-based services (LBS).

3.1 User Device Tracking and Location:

As noted above, the location of user devices is determined by using combinations of one or more existing positioning technologies to approximately deduce the location of one or more user devices. Conventional positioning technology leveraged by the Proxi-Mapper includes techniques such as GPS (or other satellite navigation), cell phone triangulation, WiFi mapping, RFID tracking, etc.

Furthermore, as long as two or more devices are known to be associated with a particular user, one device can be used for tracking purposes, while another of those user devices can be used for displaying key-point based information to the user. An example of this is that an RFID tag carried either alone as a part of another user device can be used to locate the user (via one or more nearby RFID readers in communication with the Proxi-Mapper), while location-based key-point information is then provided to a network enabled media player carried by the user. Clearly, there are many such combinations of user devices that can be used for such joint tracking and information display purposes.

In general, any conventional positioning or location identification technology can be used by the Proxi-Mapper. However, in one embodiment, the Proxi-Mapper operates in a hierarchical manner to use the most accurate positioning technique available when there is a choice of two or more available techniques for a particular device or user. For example, when a GPS enabled cell phone is capable of self-reporting a GPS location, the GPS location would tend to be more accurate than cell signal tracking via nearby cell towers.

Further, in a related embodiment, when multiple signal/tracking techniques are available for a particular user device (such as, for example, GPS, WiFi tracking, RFID readers, cell signals triangulation, mappings between the corresponding user device locations and the relative strengths are jointly mapped so that an approximate user device location can be deduced when some lesser set of those signal types are available. For example, when a user is outdoors with a GPS enabled cell phone, the location of the user can be accurately identified via a GPS receiver in the phone. However, if the user then steps into an adjacent structure, the GPS signal may be blocked while the cell signal is approximately the same. As a result, the original mapping between the cell signal and the known GPS location can be used to deduce a current user location to a higher accuracy than the use of cell signal tracking alone. Clearly, there are many such combinations of signal types and location information that can aid in deducing approximate user positions.

Note that conventional positioning or location identification technologies such as those described above are well understood by those skilled in the art, and will not be described in detail herein. Clearly, any desired type of positioning or location identification technology can be used by the Proxi-Mapper, including manual user input for specifying a current location, and as such, the Proxi-Mapper is not intended to be limited to the use of the exemplary positioning or location identification technologies referenced herein.

3.2 Key-Points:

As noted above, key-points represent local entities such as businesses (restaurants, taxis, retail stores, etc.), services (government, hospital, school, police station, etc.), people (including the user or user device(s) which is treated as a dynamic or mobile key-point), transportation modalities (e.g., personal cars, motorcycles, public trains, public buses, aircraft), personal objects (e.g., keys, wallets, computers, books), etc. As with the user, some key-points, such as taxis, keys, wallets, etc., are also treated as dynamic or mobile (see discussion of taxis in Section 2.3).

In general, key-points are either stationary or mobile. However, in various additional embodiments, key-points are further categorized into as many various types as are desired to assist the Proxi-Mapper in responding to user queries and for better matching key-points. For example, in one embodiment, key-points are defined as one of the following four types:

1. Stationary Key-Points: Stationary key-points generally include generic types of retail establishments or businesses such as "Coffee Shop," "Restaurant," "Book Store," "Gas Station," "Subway Station," "Office Building," etc.
2. Landmark Key-Points: Landmark key-points are static points that are generally known to either locals or tourists. Examples of landmark key-points include monuments, museums, famous buildings (e.g., "Space Needle" and "Empire State Building"), etc.
3. Indoor Key-Points: Indoor key-points generally represent points within an indoor building, such as a mall, particular offices, conference rooms, copy rooms, kitchens, shops, cashiers, rest rooms, etc. Each such entity is defined as a unique key-point. One simple example of such usage is for the user to query the Proxi-Mapper as to the location of a public toilet or restroom within either a particular building or any nearby building.
4. Non-Stationary Key-Points: As noted above, people (individual users) can register their current location (either manually or via automatic location determination, as described above) and make themselves discoverable to business, services, or other individuals (in any degree desired, given privacy and/or security concerns) that are also registered as key-points. As noted above, non-stationary key-points can also include a non-stationary business entity such as taxi drivers that register their current location (or allow automatic determination of their location) and the fact that they are available (with this availability being included as key-point metadata). Another example of a non-stationary key-point is a mobile food cart or the like that moves or drives to different locations to sell and/or prepare food. Other examples of non-stationary key-points include objects associated with a user, such as wallets, cars, computers, keys, etc.).

As noted above, each key-point may have metadata associated with them to enable categorization and filtering, as well as to provide sufficient information to better match those key-points to other entities in response to user queries, as described above. For example, at a minimum, each key-point includes either a name or type identifier along with a location. However, in addition, each key-point can include large amounts of other metadata such as, for example, telephone numbers, web addresses, email addresses, street addresses, listing of services or products offered, user ratings or reviews, active or current coupons or offers, etc.

3.2.1 Key-Point Database Construction and Updates:

As noted above, key-points are initially input into the key-point database using any of a number of techniques. For example, in one embodiment, vendors associated with local entities (providing particular businesses or services) are permitted to register as key-points by entering their information and geographic location via a web or Internet portal. Similarly, individuals wishing to register as key-points can also enter their data via a web or Internet portal. However, in the case of individuals (and other mobile entities including mobile services or businesses such as taxis), it is important that those entities also provide information for one or more user devices that can be tracked or located by the Proxi-Mapper. Alternately, such entities can provide the Proxi-Mapper with a current location whenever those entities are available for matching with other entities or key-points.

While there are many ways to populate the key-point database, one embodiment for populating that database is described in the following sections. It should be noted that the following example is only provided for illustrative purposes and is not intended to limit methods by which the key-point database can be populated. In particular, in one embodiment, the following sequence of steps was used to set up an initial key-point database:

1. Determine Region to be Covered by the Proxi-Map System: Clearly, a Proxi-Map based system can be constructed to cover the entire world with key-points. However, in some cases, it may be more advantageous to construct a series of local databases (such as databases on a city or state level, for example). Consequently, assuming that one or more databases comprising less than the entire world are to be constructed, it is necessary to first determine the boundaries of the region to be covered by the key-point database. Once the boundaries and geographic coordinates of this region are known, it is divided into a set of grid sections. As described above, each grid section then uses a single normalized coordinates (such as a GPS coordinate, for example) to represent the entire region of the grid section. Initially, database entries corresponding to each segment in this grid are empty.
2. Systematically Traverse Grid Sections for Data Collection: Optionally traversing the various grid sections with a device that can collect information continuously as the information collectors move around allows for a collection of data that is useful for later locating user devices, and for initially populating the database with various key-points. For example, in one embodiment, one or more data collectors traverse an area to collect the following information:
   a. GPS coordinates.
   b. Detected Cell Tower IDs and a representative sampling of cell signal strength information with respect to various towers from many points throughout the region being sampled.
   c. Detected Wi-Fi access points and a representative sampling of signal strength information from many points throughout the region being sampled.
   d. Detected RFID readers and strength of RFID signals from many points throughout the region being sampled.
   e. For locations deemed as major landmarks, insert the appropriate "landmark key-point" information into the database.
3. Process Collected Data: The data collected for each grid is processed by defining each grid section as a function of the appropriate information (such as GPS coordinates, cell tower signal strengths, etc). At this point, a preliminary key-point database has been constructed. In particular, at this point, the preliminary database will contain the following information:
   a. For most of the grid sections, there is no key-point information. However, there will typically be a great deal of information regarding cell tower signals and Wi-Fi access points inside each grid section.
   b. For a smaller subset of grid sections, there will be some basic landmark key-points.

c. Each grid section will include a normalized coordinate (such as, for example, the actual GPS coordinate corresponding to the center of each grid section.

4. Allow Business/Service/User Key-Point Input: Once the initial key-point database has been generated, as described in the preceding steps, it is important to further populate the key-point database with as many other local entities as possible in order to provide a richer user experience. As noted above, there are many techniques for allowing this data to be input into the key-point database. For example, businesses, vendors, and individual user can register their affiliated businesses, services, and/or interests so that more of the grid sections contain key-points. Note that this will typically be an ongoing process that will gradually enrich the overall database for a particular region over time.

3.3 Grid Sections and Relative Key-Point Mapping:

As discussed above, regions mapped by the Proxi-Mapper are divided into grid sections, each grid section then being identified by a single normalized coordinate (such as a latitude and longitude determined via GPS or from a preexisting map). All key-points anywhere within a grid will also be identified as being located at the same normalized position as the corresponding grid. However, metadata associated with individual key-points may include actual street addresses. In other words, the grid provides a physical (visual) approximation of the geographical distribution of key-points, and their directional proximity from each other that is accurate up to a measurable percentage of error (based on the size of each grid section).

For general use, grid sections will typically be large enough to encompass several entities such as several adjacent businesses in adjacent buildings. However, it should be clear that the Proxi-Map can be used at any scale desired. For example, the Proxi-Map can be set up to operate within a single building (such as an office building or a shopping mall, for example). In this case, grid size will be sufficiently small that individual rooms or store fronts may fill an entire grid.

For example, in the single office building scenario, grid sections will be finer grained (smaller) to allow a user to navigate to particular rooms, such as, for example, an individual office, conference rooms, printer room, kitchen, etc. In this case, it is assumed that the accuracy of the user can be tracked to greater precision. Tracking and location to very accurate positions within a building are possible using well known conventional tracking techniques, such as, for example, the use of multiple wireless network access points throughout a building for tracking network enabled wireless devices.

Similarly, in one embodiment, depending upon the accuracy of user device location tracking, and upon available bandwidth, the granularity of grid sections can be changed. For example, if the user device position is known very accurately, grid sections can be made relatively smaller to provide a finer granularity map to the user. Such granularity shifts are dependent upon the positional accuracy of key-points in the key-point database, and, in various embodiments, are performed either automatically, or upon user request.

Regardless of the size of grid section being used, one of the advantages of storing key-points in a grid format is that the whole map can be viewed as a two-dimensional array, which makes it extremely efficient to extract the corresponding range of grid sections (within a configurable distance) around a particular point (typically the user), and thus all of the key-points within that range. This enables simple user queries such as: 1) "List all restaurants within 300 meters from my present location;" or 2) "List all coffee shops near a mid-point between me and user X." One advantage of this second embodiment is that it facilitates convenient matching for user-to-user meetings with respect to business entity key-points such as a coffee shop (see the discussion of FIG. 4 for a graphical representation of this example).

3.4 Exemplary Location-Based Services:

Once the key-point database has been constructed, that database can be leveraged in a number of useful ways to provide users with pertinent local information.

For example, in one embodiment, the Proxi-Map provides is combined with a client-based UI tool and rendering application that runs on a user device to render a visual display of the aforementioned grid and the key-points inside the viewing area of the grid pivoting on a given location. In other words, a user interface (UI) displayed on a mobile user device provides a visual proximity map of entities that users may use for direction guiding purposes (see Section 4.0 and FIG. 4 for an example of this scenario). Another of the advantages to the use of this type of grid-based display is that it provides an approximate mapping service to devices that do not have inherent GPS capability, or access to high-bandwidth data transfers and highly accurate positional reporting capabilities.

The basic idea in the UI described above can be further leveraged to provide additional capabilities. For example, leveraging the UI tool available at the mobile user device, it is simple to add entity (key-point) matching or discovery features based on local key-point types and on the metadata associated with local key-points. User queries, as described above, are input via the UI tool to enable these matching and discovery features. Consequently, use of this UI tool enables the user to quickly discover entertainment, businesses, people, services, etc. that exist within a well defined proximity of the user.

Several generic examples of further user interaction with such information are generally discussed below. In particular, because some or all of the key-points include metadata, by sending that metadata to the user device, users can perform more detailed interactions with that data as illustrated by the following simple examples:

1. Entertainment Scenario:
    a. Discover the close-by parks, tourist attractions, theaters, etc. through the UI tool running on the mobile user device.
    b. Navigation inside a large grid region, (e.g., the "Forbidden City" in China) that has numerous smaller key-points within it. In this case, depending upon the accuracy of user device tracking, the Proxi-Map enable service can be used as a "tour guide tool," where each key-point can provide additional metadata-based information such as the history of a particular monument or historical artifact.
2. Business Scenario:
    a. Discover close-by businesses based on category or filter (e.g., Chinese food, fast food, coffee shops, book stores, etc.) through the UI tool running on the mobile user device.
    b. Key-points can include metadata that provides electronic coupons or sales information that will be made available to Proxi-Map service users in the vicinity of corresponding businesses. Additional examples of metadata that can be provided to user devices via the UI tool include metadata representing price ranges (such as a restaurant's dinner menu), user rating, reviews, hours of operation, pictures of the business, etc.

c. Discoverability/matching between users and non-stationary businesses such as matching between a user and a taxi driver, as discussed above.

3. Social Scenario: In general, the "social scenario" allows matching between people that: 1) have chosen to reveal their current location and/or interests as public; 2) have identified one another as peers/friends; or 3) have otherwise indicated allowable sharing of a common set of metadata (e.g., specific interests, gender, age range, etc.) and have chosen to be automatically matched by the Proxi-Mapper.

4. Lost Object Scenario: In general, the "lost object" scenario allows matching between a user and particular objects. For example, if the user loses a set of car keys, a wallet, a notebook computer, or simply forgets where he parked his car, he can use the functionality of the Proxi-Mapper to locate those devices. For example, if the user forgets where his car is parked, and the car has integral GPS capability, the car, as a key-point, can report its relative location to the user just like any other key-point. Similar examples include RFID tags in a wallet or on a set of keys. Clearly, as long as the "lost object" can be tracked using conventional tracking techniques, and as long as it is registered as a key-point, its location can be reported to the user as a key-point in response to a user query, Clearly, the simple examples described above are not intended to limit the scope of the services enabled by the Proxi-Mapper. In fact, such examples are provided simply for purposes of explanation in describing some of the basic capabilities of the Proxi-Mapper.

4.0 Exemplary UI for User Devices:

The following paragraphs summarize one example of a simple UI for implementing display of key-points on a user device and for providing basic user query capabilities. Furthermore, the UI described below with respect to FIG. 4 is intended to be understood in view of the processes described above with respect to FIG. 1 through FIG. 3, and in further view of the detailed description provided above in Sections 2 and 3.

In general, FIG. 4 illustrates an exemplary UI rendered on a user device, such as a cell phone, PDA, media player, etc., for displaying key-points returned to the user device by the Proxi-Mapper system described above.

In general, one of the advantages of using the above-described grid format for mapping key-points is that there is no need to waste bandwidth and computing power to render actual maps for every user device. Further, the user or user device may not have access to the bandwidth necessary to transmit actual maps. Consequently, sending a simple data stream to the user device, such as an SMS text message, will provide sufficient data to the user device to render a UI such as the UI illustrated by FIG. 4.

For example, with respect to FIG. 4, the user device is only required to render a predefined or user specified number of grid sections (such as grid section 405) on a display 400 of that user device. Once rendered, one or more of the grid sections is populated with either textual or graphical data to indicate the key-points contained within those grid sections. In one embodiment, icons such as taxi icon 410, is displayed in the appropriate grid section. In addition, in a related embodiment, textual information, including the number of entities (e.g., three taxis) can also be indicated in close proximity to the icon representing a key-point. It should be noted that rather than transmit icons to the user device, it is more bandwidth efficient to store some set of icons locally (on the user device), then simply render that icon when corresponding key-point data is provided to the user device by the Proxi-Mapper system. FIG. 4 illustrates a number of key-points in various grid sections. For example, these key-points include taxis 410, an entity named Bill 415, a hospital 425, an indication or icon representing the user device 430 (labeled "USER"), etc.

In addition to illustrating one or more key-points in the various grid sections, FIG. 4 also illustrates direction or guidance capability of the Proxi-Mapper. For example assume that the user 430 queries the Proxi-Mapper (via a key-point selection/query window 460) as to the location of an entity named Steve 435 and the location of any coffee shop 450 at some point between the user and the entity Steve. In this case, the Proxi-Mapper will return key-point and metadata information sufficient to allow the local user device to render the relevant grid sections, populate those grid sections with key-points, and draw an approximate path 455 between the user and Steve that approximately passes near or through a coffee shop 450.

In further embodiments, metadata associated with one or more of the key-points rendered within a grid section may be displayed via a pop-up 420 in response to user selection or mouse-over type action. Further, this type of metadata may also be displayed in an optional information detail window 465. To further assist the user in interacting with the key-points returned by the Proxi-Mapper, the rendered UI may also include a user interface window for setting various options or otherwise interacting with the metadata associated with one or more of the key-points.

In yet another embodiment, a direction indicator 475 is included in the UI rendered on display 400 of the user device. This direction indication can be created in a fixed north-up configuration, or, depending upon the capabilities of the device, can dynamically indicate the current direction of travel of the user.

Finally, in another embodiment, a grid zoom/pan/detail level control 470 is provided to allow the user greater control over the UI being rendered on the display 400 of the user device. For example, if the user zooms out, the rendered grid sections will decrease in size, thereby providing space for additional grid sections, and thus more key-point information. Conversely, if the user zooms in, the rendered grid sections will be larger, thereby limiting the number of grid sections (and key-points) that can be displayed.

Clearly, the simple UI window described with respect to FIG. 4 does not illustrate all of the various embodiments described throughout this document. As noted above, FIG. is simply intended to illustrate the type of information that can be rendered on a user device using only key-point information by rendering that information in a grid-based format.

The foregoing description of the Proxi-Mapper has been presented for the purposes of illustration and description. It is not intended to be exhaustive or to limit the invention to the precise form disclosed. Many modifications and variations are possible in light of the above teaching. Further, it should be noted that any or all of the aforementioned alternate embodiments may be used in any combination desired to form additional hybrid embodiments of the Proxi-Mapper. It is intended that the scope of the invention be limited not by this detailed description, but rather by the claims appended hereto.

What is claimed is:

1. A system for providing one or more mobile user devices with locally relevant information, comprising:
   automatically determining an approximate position of at least one user device;
   reporting the approximate position to a remote server;

querying a database of geographic points of interest to identify a set of one or more geographic points of interest within a predetermined distance from the approximate position of the at least one user device;

wherein each geographic point of interest has been assigned to a predetermined grid section approximately corresponding to a known physical location of that geographic point of interest;

returning the set of one or more geographic points of interest to one or more of the user devices;

rendering a grid-based display of the grid sections which illustrates graphical representations of each of the returned geographic points of interest on a display device of one or more of the user devices, wherein a representation of each geographic point of interest is rendered in a corresponding one of the rendered grid sections; and wherein a representation of the approximate position is rendered in one of the grid sections corresponding to the approximate position of the at least one user device.

2. The system of claim 1 wherein each grid section represents a geographic area of a predetermined size, and wherein each grid section is identified by a single geographic point, regardless of total grid section size.

3. The system of claim 2 wherein assigning geographic points of interest to one of the predetermined grid sections comprises assigning all geographic points of interest falling within the geographic area of a particular grid section to that grid section, and using the single geographic point for that grid section to indicate the geographic position of all geographic points of interest in that grid section.

4. The system of claim 1 wherein one or more of the geographic points of interest in the database of geographic points of interest include metadata that describes additional information for defining those geographic points of interest.

5. The system of claim 4 wherein returning the set of one or more geographic points of interest from the remote server to one or more of the user devices further includes returning the metadata associated with each returned geographic point of interest from the remote server to one or more of the user devices.

6. The system of claim 1 wherein a user query is sent from one of the user devices to the remote server before querying the database of geographic points of interest, and wherein querying the database of geographic points of interest is limited by the user query such that only those geographic points of interest matching the user query are returned the remote server to one or more of the user devices.

7. The system of claim 1 wherein geographic points of interests include any one or more of:
  businesses having a known or determinable location;
  services having a known or determinable location;
  transportation modalities having a known or determinable location;
  objects having a known or determinable location; and
  people having a known or determinable location.

8. A computer readable medium having computer executable instructions stored thereon for providing location-based services via an electronic device, comprising instructions for:
  determining an approximate position of a user device;
  querying a database of location-based services to determine which of the location-based services are within a predetermined distance from the approximate position of the user device;
  returning a set of available location-based services to the user device, said set comprising one or more of the location-based services that are within the predetermined distance from the approximate position of the user device;
  assigning each available location-based service in the returned set to a particular one of a plurality of grid sections corresponding to a physical location of each of those location-based services; and
  rendering a grid-based display on the user device comprising the grid sections for illustrating graphical representations of each available location-based service in a corresponding one of the rendered grid sections.

9. The computer readable medium of claim 8 further comprising instructions for rendering a representation of the approximate position of the user device in one of the grid sections corresponding to the approximate position of the user device.

10. The computer readable medium of claim 8 wherein each grid section represents a geographic area of a predetermined size and wherein each grid section is identified by a single geographic point corresponding to a physical point within each geographic area.

11. The computer readable medium of claim 10 wherein assigning each available location-based service to a particular one of the grid sections comprises assigning those location-based services that are physically located within a particular geographic area to the corresponding grid section.

12. The computer readable medium of claim 8 further comprising instructions for ranking the location-based services that are within the predetermined distance from the approximate position of the user device, and wherein the set of available location-based services returned to the user device is limited as a function of the ranking associated with each location-based service.

13. The computer readable medium of claim 8 further comprising instructions for determining whether the user device is authorized to receive one or more of the location-based services that are within the predetermined distance from the approximate position of the user device, and wherein the set of available location-based services returned to the user device is limited to include only authorized location-based services.

14. The computer readable medium of claim 8 further comprising instructions for rendering the grid-based display as an overlay on a geographic map of the area corresponding to grid sections.

15. The computer readable medium of claim 8 further comprising instructions for automatically pushing coupons corresponding to one or more of the available location-based services to the user device.

16. A method for dynamically providing location-based service information to a user device, comprising;
  dynamically determining a current geographic position of a user device, said current geographic position being periodically updated over time;
  determining a current set of possible location-based services within a known distance of the geographic position of the user device, said current set of possible location-based services being updated whenever the current geographic position of the user device is updated;
  providing a subset of available location-based services to the user device from the current set of possible location-based services, said subset of available location-based services being updated whenever the current geographic position of the user device is updated;
  assigning each available location-based service a grid section corresponding to a physical location of each of those location-based services;

rendering a grid-based display on the user device comprising the grid sections for providing a graphical representation of each available location-based service in a corresponding one of the rendered grid sections; and rendering a representation of the approximate position of the user device in one of the grid sections corresponding to the approximate position of the user device.

17. The method of claim 16 further comprising limiting the set of available location-based services as a function of a user initiated query for location-based services.

18. The method of claim 16 further limiting the set of available location-based services as a function of whether the user device is authorized to receive those location-based services from the set of possible location-based services.

19. The method of claim 16 wherein the available location-based services include one or more of:

matches to specific local businesses;

matches to specific local services;

matches to local transportation modalities having a known or determinable location;

matches to specific objects having a known or determinable location; and matches to specific people having a known or determinable location.

20. The method of claim 16 wherein one or more of the location-based services includes metadata that describes additional information for defining those location-based services, and wherein the additional information for a particular location-based service is rendered on the user device in response to user selection of the graphical representation corresponding to that particular location-based service.

* * * * *